March 21, 1967  E. K. HURST  3,310,190
INFANTS FEEDING DEVICES
Filed Sept. 28, 1965

3,310,190
INFANTS FEEDING DEVICES
Eric Kenneth Hurst, Long Cross, near Chertsey, England, assignor to Lewis Woolf Griptight Limited, Birmingham, England, a British company
Filed Sept. 28, 1965, Ser. No. 490,793
Claims priority, application Great Britain, Oct. 5, 1964, 40,403/64; Feb. 16, 1965, 6,598/65
2 Claims. (Cl. 215—11)

This invention relates to disposable infants feeding devices of the kind comprising a presealed liquid container, and a teat capable of being arranged in liquid tight engagement about an aperture of the container, the object of the invention being to provide a device of this kind in a convenient form.

In accordance with the present invention a disposable infants feeding device of the kind specified comprises a liquid container having an apertured portion and a lip portion surrounding said apertured portion, a teat holder detachably engageable with the lip portion, a teat having a flange which is trapped to form a seal between the teat holder and the container when the teat and teat holder are engaged on the container, and a detachable cover carried by the teat holder.

Figure 1:
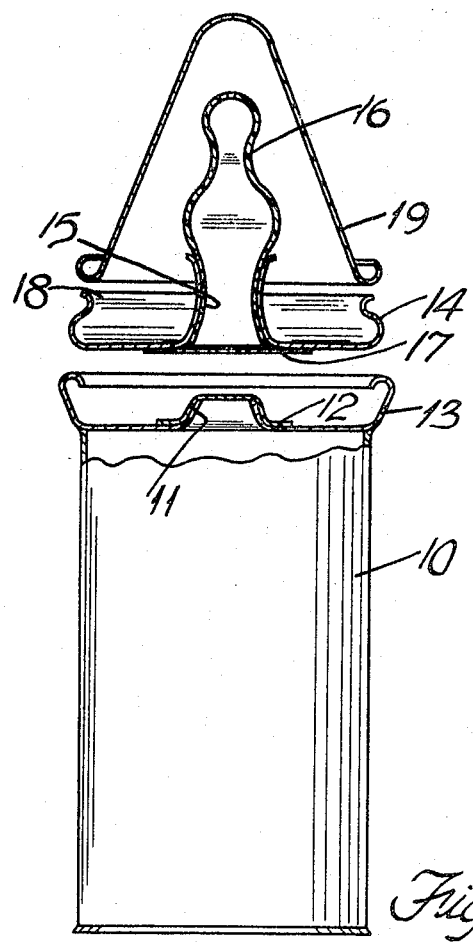
Figure 2:
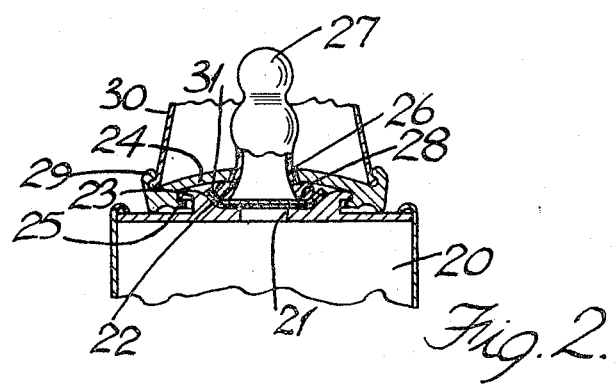

The invention will now be described by way of example with reference to the accompanying drawings in which:

FIGURE 1 is an exploded cross-sectional view of a first form of feeding device in accordance with the invention and FIGURE 2 is a partial cross-sectional view of an alternative form.

In the example of the invention shown in FIGURE 1 there is provided an infants feeding device which is intended to be disposed of when a supply of liquid food carried thereby has become exhausted.

The device comprises a container 10 for the liquid, which is generally cylindrical and is formed from a synthetic resin metal or board coated with synthetic resin or other rigid material. An end of the container has a conical or other raised portion 11 at its center, the apex of which is apertured to provide an outlet from the container. In order to avoid contamination of this portion and to form a seal, a detachable adhesive coated sealing member 12 is secured over this portion.

The edge of the container 10 surrounding this portion 11 is formed with an inwardly directed lip 13 which detachably engages with an annular edge portion of a teat holder 14. In a central flared hole 15 in the teat holder 14, a teat 16 is secured so as to extend away from the end of the container 10. When the teat holder 14 is in this position an approximately conical flange portion of the teat 16 is trapped in sealing engagement between the raised portion 11 of the container 10 surrounding the aperture and the teat holder 14.

To prevent contamination of the interior of the teat 16 there may be provided a further detachable adhesive coated sealing member 17 which extends across the open end of the teat.

Engaged with an inwardly directed lip 18 formed at the annular edge of the teat holder 14, is a detachable cover 19 which encloses the teat.

In use, the container 10, teat holder 14, teat 16 and cover 19 are assembled and may be secured together by an adhesive strip (not shown) covering the interengaging edge portions of the container 10 and teat holder 14 and cover 19 and the assembly if desired, may be sterilized by subjection to gamma rays.

When the device is required for use, the teat holder 14, teat 16 and cover 19 are removed as a unit from the container 10, the outlet from the container is exposed by removal of the sealing member 12 and the teat interior is also opened by removal of the sealing member 17. Next the teat holder 14, teat 16 and cover 19 are replaced, the skirt of the teat 16 taking up its position in which it is in liquid-tight engagement with the raised portion 11 of the container 10, during assembly.

Finally, the cover 19 is removed and the device is ready for use.

In the example shown in FIGURE 2 there is provided a feeding device comprising a cylindrical container 20 which at one end has a central aperture 21. The aperture 21 is covered by a sealing member 22. The end of the container 20 is formed with an integral lip portion 23 surrounding the central aperture 21, this lip portion being spaced from the external edge of the container 20. Detachably engaged with this lip portion 23 is a teat holder 24 having a corresponding lip portion 25 which can be snapped onto that of the container 20. The teat holder 24 has a central opening 26 through which protrudes a teat 27 having a flange which is so dimensioned that it can be trapped between substantially flat surfaces on the container 20 and the teat holder 24 respectively when the respective lip portions 23 and 25 are interengaged. A further lip portion 29 on the teat holder 24 is provided near its outer edge, this being engageable by a removable teat cover 30 which serves totally to enclose the teat 27 when it is not required for use.

Before use, the container aperture 21 is sealed by the sealing member 22 and the interior of the teat is also sealed by the provision of a further sealing member 31 on the base of the teat flange 28. The device is supplied with the parts assembled as shown with these intervening sealing members 22 and 31 in place or at least that on the container aperture 21. The teat holder together with the teat and cover are then removed, the sealing members being broken or removed, and the teat holder 24, teat 27 and cover 30 are replaced. Only then is it necessary to remove the cover 30 to expose the teat 27, thus reducing the risk of contamination. As in the example shown in FIGURE 1 the device has no provision for refilling and is intended to be discarded when the contents has been used.

Having thus described my invention what I claim as new and desire to secure by Letters Patent is:

1. A disposable infants feeding device comprising a liquid container having a portion which is provided with an aperture for the escape of liquid, a sealing member covering the aperture before use and removable to expose the aperture, the container having a lip portion, a teat holder detachably engaged with the lip portion of the container, a flanged teat carried by the teat holder and, when the teat and teat holder are fitted to the container, the flange of the teat surrounds the aperture and is trapped between the container and teat holder, there being a detachable cover carried by the teat holder.

2. A disposable infants feeding device as claimed in claim 1 in which the flange of the teat is at one end thereof, this end being closed, before use, by a further detachable sealing member.

References Cited by the Examiner

UNITED STATES PATENTS

| 3,115,980 | 12/1963 | De Woskin | 215—11 |
| 3,146,904 | 9/1964 | Hansen et al. | 215—11 |
| 3,161,311 | 12/1964 | Boston | 215—11 |
| 3,214,053 | 10/1965 | Roberson et al. | 215—11 |

FOREIGN PATENTS

| 967,314 | 3/1950 | France. |
| 922,853 | 1/1955 | Germany. |

JOSEPH R. LECLAIR, *Primary Examiner.*

D. F. NORTON, *Assistant Examiner.*